US012565914B2

(12) United States Patent
Karuppannan et al.

(10) Patent No.: US 12,565,914 B2
(45) Date of Patent: Mar. 3, 2026

(54) POWER TRANSFER ARRANGEMENT INCLUDING COUPLING CLUTCHES FOR AN AGRICULTURAL VEHICLE

(71) Applicant: CNH Industrial America LLC, New Holland, PA (US)

(72) Inventors: Thamilselvan Karuppannan, Bettendorf, IA (US); Joel T. Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 649 days.

(21) Appl. No.: 18/078,488

(22) Filed: Dec. 9, 2022

(65) Prior Publication Data

US 2024/0188495 A1 Jun. 13, 2024

(51) Int. Cl.
| | |
|---|---|
| *F16D 11/10* | (2006.01) |
| *A01D 41/14* | (2006.01) |
| *A01D 45/02* | (2006.01) |
| *F16D 7/00* | (2006.01) |

(Continued)

(52) U.S. Cl.
CPC ............ F16D 11/10 (2013.01); A01D 41/142 (2013.01); A01D 45/021 (2013.01); F16D 7/00 (2013.01); F16D 23/00 (2013.01); F16J 15/3204 (2013.01)

(58) Field of Classification Search
CPC ....... F16J 15/3204; F16D 11/10; F16D 23/00; F16D 7/00; A01D 69/08; A01D 45/021; A01D 41/142
See application file for complete search history.

(56) References Cited

U.S. PATENT DOCUMENTS

| | | | |
|---|---|---|---|
| 2,942,399 A | 6/1960 | Mills | |
| 3,643,767 A * | 2/1972 | Fleming | ................. F16D 11/10 |
| | | | 192/48.91 |

(Continued)

FOREIGN PATENT DOCUMENTS

| | | |
|---|---|---|
| CN | 201613323 U | 10/2010 |
| CN | 202971529 U | 6/2013 |

(Continued)

OTHER PUBLICATIONS

Extended European Search Report for EP Application No. 23215595.2 dated May 15, 2024 (9 pages).

*Primary Examiner* — Arpad Fabian-Kovacs
(74) *Attorney, Agent, or Firm* — CM Law PLLC; Stephen J. Weed

(57) ABSTRACT

A power transfer arrangement includes: a first drive shaft configured to couple to a power source; a first slip clutch assembly including a drive hub, a clutch housing coupled to the drive hub, and a clutch hub disposed partially within the clutch housing and including a coupling that extends outside of the clutch housing and is coupled to the first drive shaft, the clutch hub being configured to rotate the clutch housing and the coupled drive hub; a second drive shaft coupled to the clutch hub; a gearbox coupled to the drive hub; and a second slip clutch assembly including a second drive hub, a second clutch housing coupled to the second drive hub, and a second clutch hub disposed partially within the second clutch housing and including a second coupling that extends outside of the second clutch housing and is coupled to the second drive shaft.

18 Claims, 5 Drawing Sheets

(51) Int. Cl.
  F16D 23/00 (2006.01)
  *F16J 15/3204* (2016.01)

(56) References Cited

U.S. PATENT DOCUMENTS

| | | | | |
|---|---|---|---|---|
| 3,953,012 A * | 4/1976 | Robinson | ................... | F16F 1/14 |
| | | | | 267/284 |
| 3,982,385 A * | 9/1976 | Hyman | ................ | A01D 45/025 |
| | | | | 56/106 |
| 4,115,983 A * | 9/1978 | Barnes | ................. | A01D 43/082 |
| | | | | 56/111 |
| 4,227,366 A | 10/1980 | Pucher | | |
| 4,244,162 A * | 1/1981 | Pucher | ................ | A01D 45/021 |
| | | | | 56/14.2 |
| 4,568,310 A | 2/1986 | Demey, II | | |
| 6,349,528 B1 | 2/2002 | Goering et al. | | |
| 7,937,918 B1 * | 5/2011 | Mossman | .............. | A01D 43/08 |
| | | | | 56/11.7 |
| 9,072,221 B2 | 7/2015 | Ritter et al. | | |
| 10,694,671 B2 * | 6/2020 | Terryn | ................... | A01D 69/08 |
| 10,820,509 B2 | 11/2020 | Schroeder et al. | | |
| 11,161,494 B2 | 11/2021 | Brammeier et al. | | |
| 11,746,836 B2 * | 9/2023 | Ricketts | ................. | F16D 43/21 |
| | | | | 56/11.7 |
| 11,825,770 B1 * | 11/2023 | Gessel | ................... | A01D 69/08 |
| 2008/0015034 A1 | 1/2008 | Downey | | |
| 2009/0192734 A1 * | 7/2009 | Mackin | ................ | A01D 45/021 |
| | | | | 702/56 |
| 2021/0284123 A1 * | 9/2021 | Brammeier | ............. | F16D 7/048 |

FOREIGN PATENT DOCUMENTS

| | | | | |
|---|---|---|---|---|
| DE | 19951644 A1 * | 5/2001 | ............... | F16D 7/02 |
| DE | 102014107107 A1 * | 11/2015 | ........... | F16J 15/3284 |
| EP | 0775437 A1 * | 5/1997 | ............ | A01D 69/06 |
| EP | 2781149 A2 | 9/2014 | | |
| EP | 2995188 A1 | 3/2016 | | |

* cited by examiner

POWER TRANSFER ARRANGEMENT INCLUDING COUPLING CLUTCHES FOR AN AGRICULTURAL VEHICLE

FIELD OF THE INVENTION

The present invention pertains to power transfer arrangements and, more specifically, to power transfer arrangements for use in agricultural vehicles.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

The header of the harvester typically includes a power transfer arrangement that draws power from a power source, which may be a power take-off coupled to the engine, in order to drive operations. Some headers, such as those configured for harvesting corn, have multiple independent uses for drawn power. For example, a header configured for harvesting corn may have a drive shaft that powers operation of choppers of the header and a separate drive shaft that powers operation of row units of the header. One particular issue with such power transfer arrangements is that they are often large systems with many components located in tight spaces, which makes it difficult to install and service the components. If one component of the power transfer arrangement, such as a clutch or gearbox, needs to be serviced, typically a large portion of the header needs to be dissembled in order to access and service the component. It thus takes a considerable amount of time and effort to service components of the power transfer arrangement.

What is needed in the art is a way to reduce the amount of time needed to service components of a power transfer arrangement for a header.

SUMMARY OF THE INVENTION

Exemplary embodiments disclosed herein provide a power transfer arrangement including slip clutch assemblies each having a clutch hub with a coupling to couple to a respective drive shaft so the clutch assemblies act as both a clutch and a coupler.

In some exemplary embodiments provided according to the present disclosure, a power transfer arrangement for a header of an agricultural vehicle includes: a first drive shaft configured to couple to a power source; a first slip clutch assembly including a drive hub, a clutch housing coupled to the drive hub, and a clutch hub disposed partially within the clutch housing and including a coupling that extends outside of the clutch housing and is coupled to the first drive shaft, the clutch hub being configured to rotate the clutch housing and the coupled drive hub; a second drive shaft coupled to the clutch hub; a gearbox coupled to the drive hub; and a second slip clutch assembly including a second drive hub, a second clutch housing coupled to the second drive hub, and a second clutch hub disposed partially within the second clutch housing and including a second coupling that extends outside of the second clutch housing and is coupled to the second drive shaft.

In some exemplary embodiments provided according to the present disclosure, a header for an agricultural vehicle includes: a header frame; a plurality of row units carried by the header frame, each of the row units including a pair of deck plates that are movable to adjust a size of a gap therebetween; a plurality of choppers, each of the choppers being associated with at least one respective row unit and including a blade; a power source; and a power transfer arrangement including: a first drive shaft configured to couple to the power source; a first slip clutch assembly including a drive hub, a clutch housing coupled to the drive hub, and a clutch hub disposed partially within the clutch housing and including a coupling that extends outside of the clutch housing and is coupled to the first drive shaft, the clutch hub being configured to rotate the clutch housing and the coupled drive hub; a second drive shaft coupled to the clutch hub; a gearbox coupled to the drive hub and one of the row units or one of the choppers; and a second slip clutch assembly including a second drive hub, a second clutch housing coupled to the second drive hub, and a second clutch hub disposed partially within the second clutch housing and including a second coupling that extends outside of the second clutch housing and is coupled to the second drive shaft.

In some exemplary embodiments provided according to the present disclosure, an agricultural vehicle includes a chassis, a feeder housing carried by the chassis, and a header coupled to the feeder housing. The header includes: a header frame; a plurality of row units carried by the header frame, each of the row units including a pair of deck plates that are movable to adjust a size of a gap therebetween; a plurality of choppers, each of the choppers being associated with at least one respective row unit and including a blade; a power source; and a power transfer arrangement including: a first drive shaft configured to couple to the power source; a first slip clutch assembly including a drive hub, a clutch housing coupled to the drive hub, and a clutch hub disposed partially within the clutch housing and including a coupling that extends outside of the clutch housing and is coupled to the first drive shaft, the clutch hub being configured to rotate the clutch housing and the coupled drive hub; a second drive shaft coupled to the clutch hub; a gearbox coupled to the drive hub and one of the row units or one of the choppers; and a second slip clutch assembly including a second drive hub, a second clutch housing coupled to the second drive hub, and a second clutch hub disposed partially within the second clutch housing and including a second coupling that extends outside of the second clutch housing and is coupled to the second drive shaft.

One possible advantage that may be realized by exemplary embodiments provided according to the present disclosure is that the slip clutch assemblies can be uncoupled from each other and removed to easily and conveniently service different components of the power transfer arrangement.

Another possible advantage that may be realized by exemplary embodiments provided according to the present disclosure is that the slip clutch assemblies can be provided with contamination reducing measures, such as seals, to increase the longevity of the assemblies.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
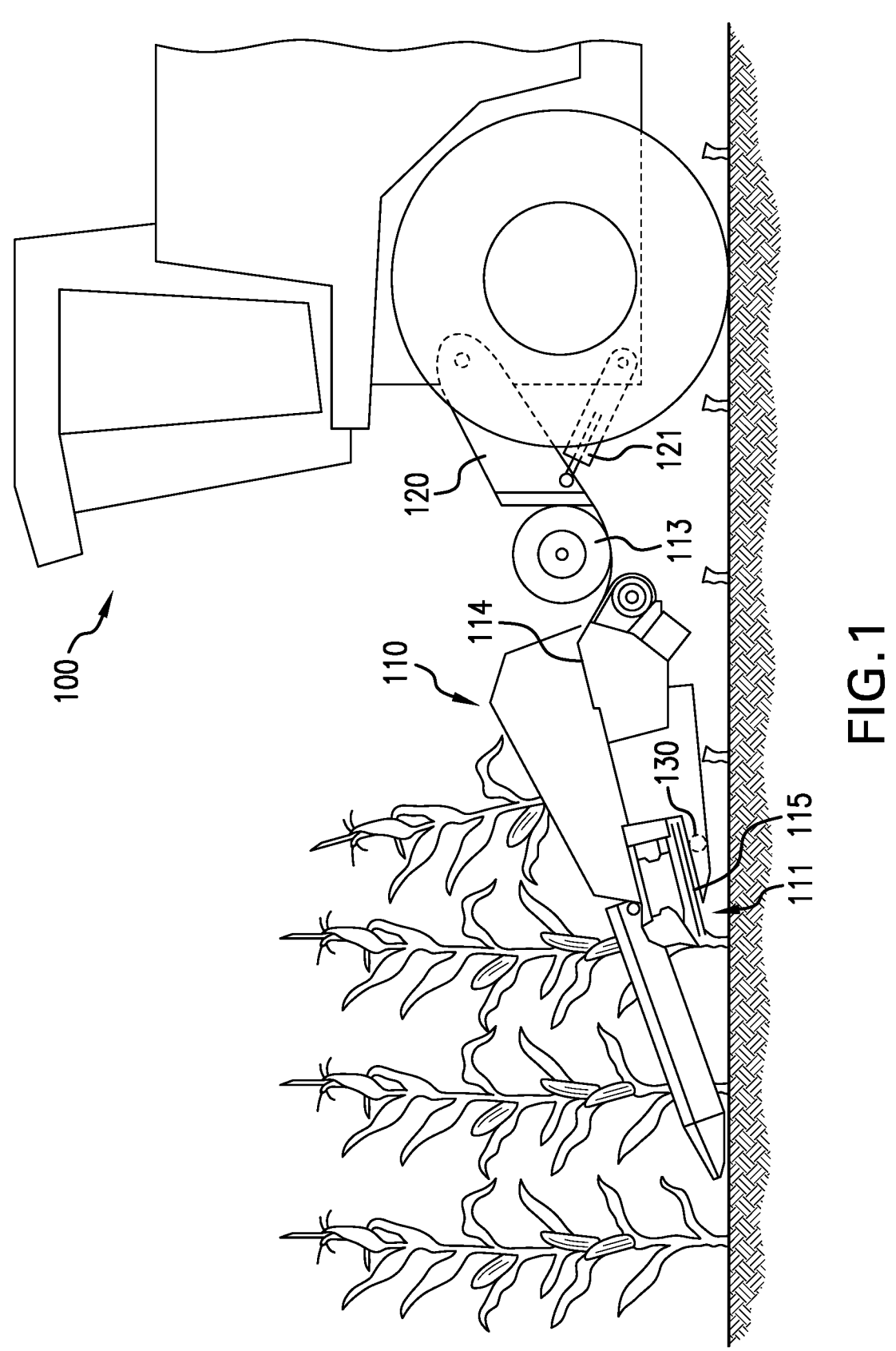
FIG. 1 illustrates a perspective view of an exemplary embodiment of an agricultural vehicle in the form of a combine carrying a header configured to harvest corn, in accordance with the present disclosure.

Referring now to FIG. 1, an exemplary embodiment of an agricultural vehicle 100 is illustrated in the form of a combine harvester that includes a header 110 that is configured for harvesting corn or other stalked crops. The header 110 is mounted to the vehicle 100 by coupling to a feeder housing 120 and an actuator 121. The header 110 includes a header frame 114 carrying a plurality of choppers 111, which may also be referred to as "cutting units," that can be used to, for example, chop stalks using a rotated blade 115, which may be a bladed wheel and also be referred to as a "cutting element." Crop material collected by the header 110 may then be conveyed to the feeder housing 120 by a screw conveyor 113. The choppers 111 are driven by connection to a gearbox 130.

Figure 2:
FIG. 2 illustrates a bottom view of the header illustrated in FIG. 1 showing a power transfer arrangement provided in accordance with the present disclosure.

Referring now to FIG. 2 as well, it is illustrated that the header 100 also includes a plurality of row units 210. Each of the row units 210 includes a pair of deck plates 211A, 211B. At least one of the deck plates 211A, 211B is movable to adjust a gap therebetween, as is known; in some embodiments, both of the deck plates 211A, 211B are movable. The row units 210 may admit stalks in the gap between the deck plates 211A, 211B and pull corn ears on the stalks down to the deck plates 211A, 211B where the corn ears are snapped from the stalks for collection. The choppers 111 also cut the stalks during collection. In this respect, each chopper 111 is associated with at least one respective row unit 210 so the row units 210 and choppers 111 can conjunctively collect the corn ears and chop the stalks so only stubble remains in the field after collection of the corn heads by the header 100, as illustrated in FIG. 1. In some embodiments, each chopper 111 is associated with a respective one row unit 210 so the number of choppers 111 and row units 210 is the same, but it should be appreciated that the number of choppers 111 and row units 210 can be different. While the agricultural vehicle 100 is illustrated in the form of a combine harvester with a header configured for harvesting corn or other stalked crop, the present disclosure is similarly applicable other types of agricultural vehicles and implements, including but not limited to agricultural vehicles with headers configured for harvesting grain, rototillers, and other implements that utilize power transfer arrangements to drive components.

In known agricultural vehicles, the choppers and row units may be powered by separate power transfer arrangements, with one power transfer arrangement driving the choppers and another power transfer arrangement driving the row units. Both power transfer arrangements may be powered by a power source, such as a power take-off that is coupled to an engine or other power source of the agricultural vehicle. Each power transfer arrangement may include a plurality of gearboxes driven by a single drive shaft so the row units are each driven by a respective gearbox coupled to a first drive shaft and the choppers are each driven by a respective gearbox coupled to a second drive shaft. Thus, the first drive shaft drives all of the row units and the second drive shaft drives all of the choppers.

While such power transfer arrangements are effective, servicing the arrangements is difficult. In particular, servicing any of the power transfer components may require that all of the gearboxes are disconnected from the respective drive shaft. In a header that may include a large number (10+) of row units and choppers, servicing the components can be burdensome. Further, any damage to one of the drive shafts, e.g., a bend in the middle of the drive shaft, may require the entire drive shaft to be replaced. Since the drive shafts generally span a large portion of the width of the header, replacing one of the drive shafts can be expensive despite most of the drive shaft being undamaged.

Figure 3:
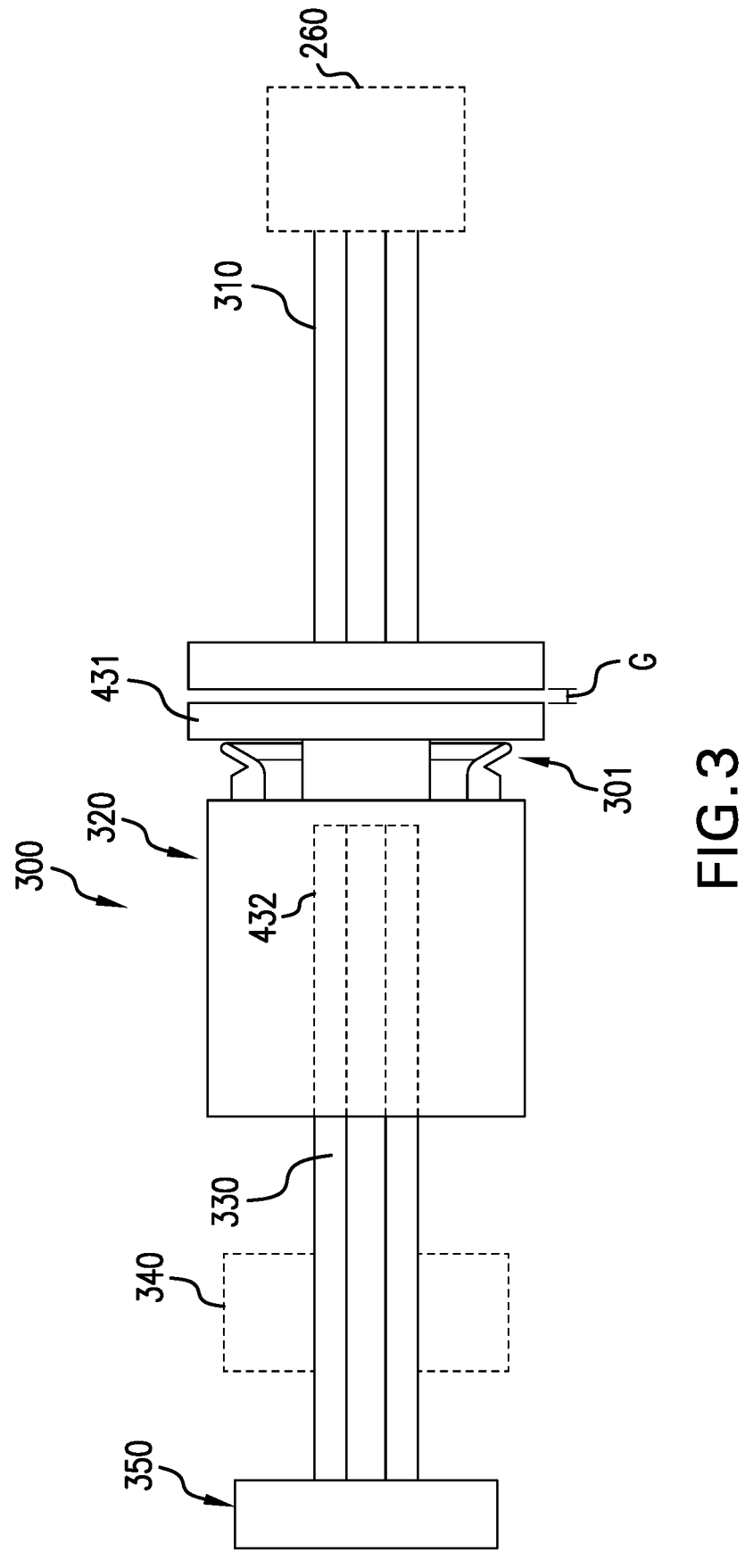
FIG. 3 illustrates a cross-sectional view of a portion of the power transfer arrangement illustrated in FIG. 2.
Figure 4:
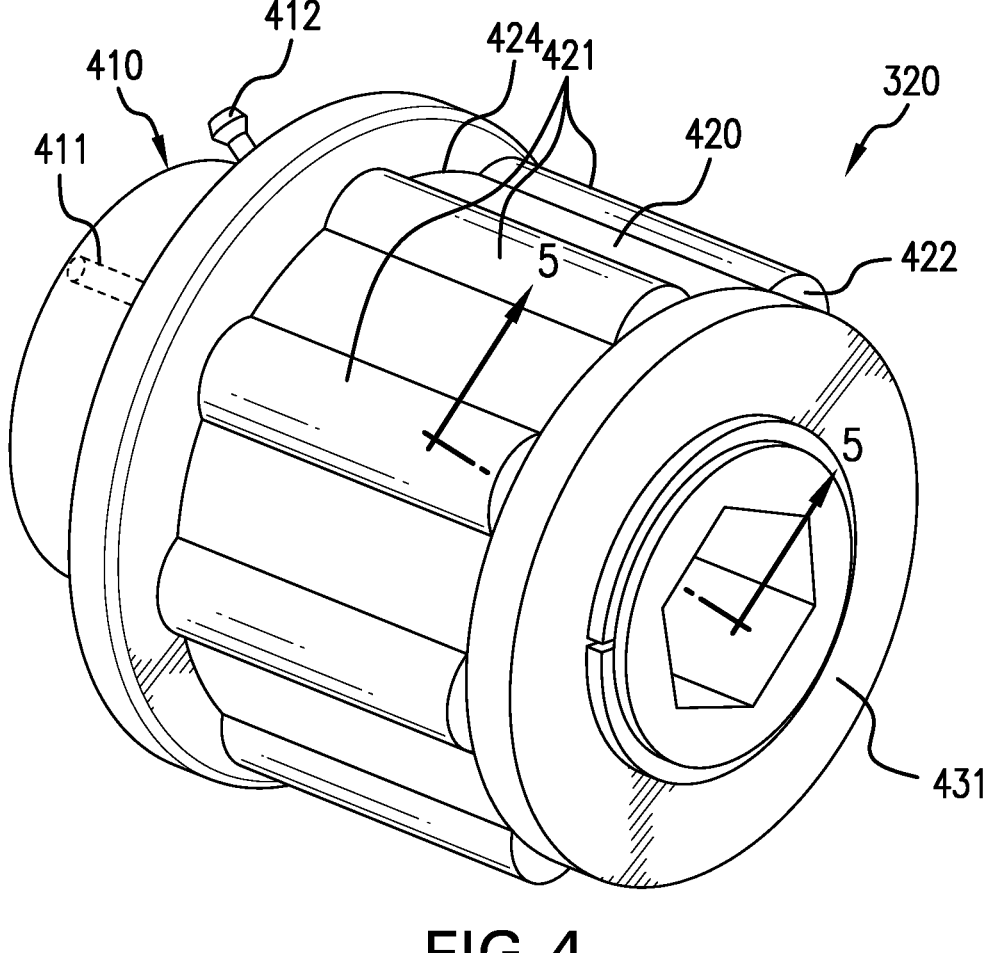
FIG. 4 illustrates a perspective view of an exemplary embodiment of a slip clutch assembly that may be included in the power transfer arrangement of FIGS. 2-3, provided in accordance with the present disclosure.
Figure 5:
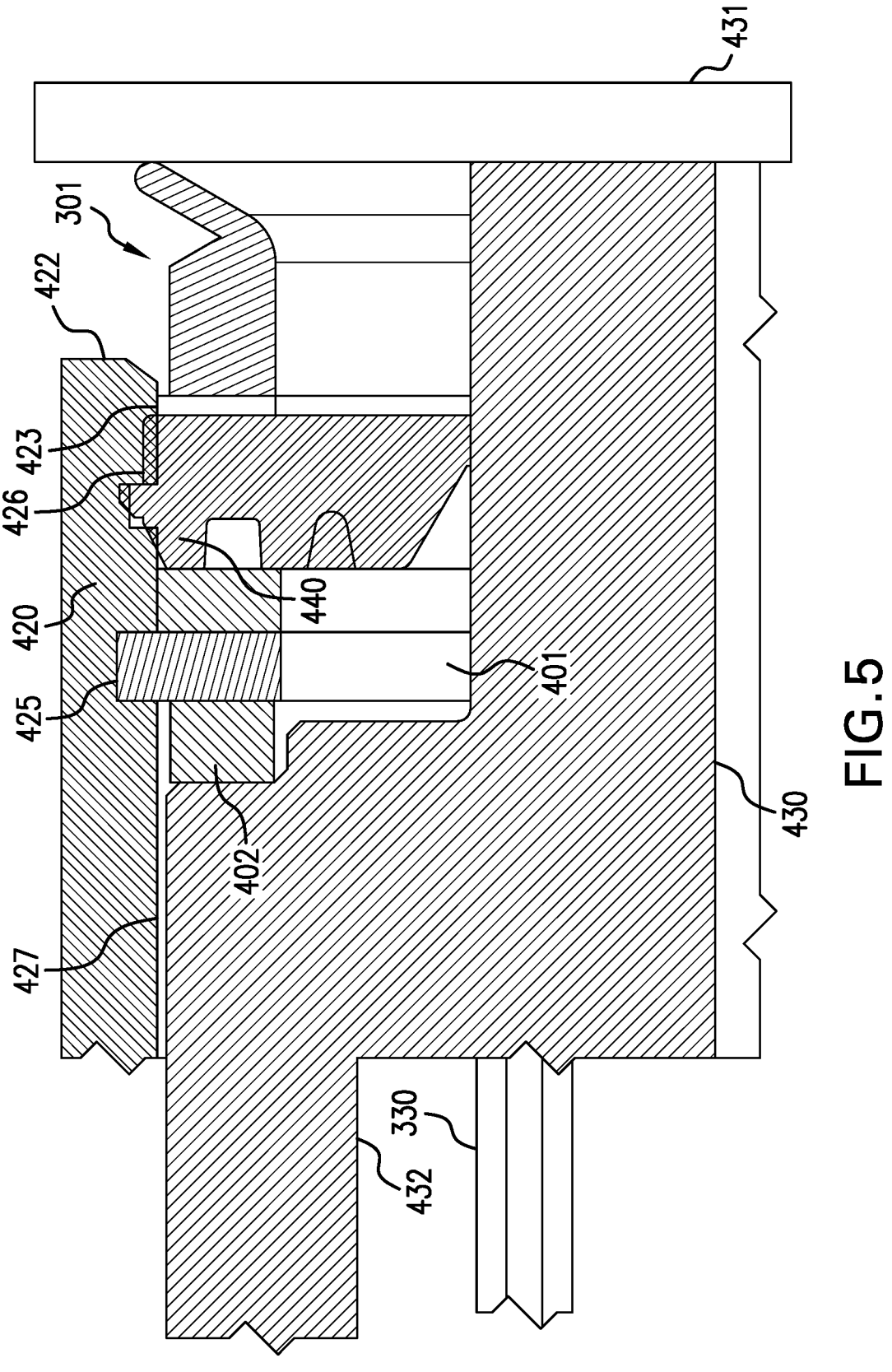
FIG. 5 illustrates a cross-sectional view of the slip clutch assembly of FIG. 4.

To address some of the previously described issues with known agricultural vehicles, and referring still to FIG. 2 and now FIGS. 3-5 as well, an exemplary embodiment of a power transfer arrangement 300 provided according to the present disclosure includes a first drive shaft 310, a first slip clutch assembly 320, a second drive shaft 330, a gearbox 340, and a second slip clutch assembly 350. The first drive shaft 310 is configured to be coupled to, and in some embodiments is coupled to, a power source 260. In some embodiments, the power source 260 may be a primary gearbox that is coupled to a power take-off or other source of power. While the power source 260 is described as possibly being a primary gearbox that is driven by power from a separate source, it should be appreciated that the power source 260 may also be a power generating component, such as an internal combustion engine, a hydraulic motor, etc.

The first slip clutch assembly 320 is coupled to the first drive shaft 310 and acts to transfer power from the first drive shaft 310 to the gearbox 340 with overload torque protection. The gearbox 340 can be coupled to and thus power one of the choppers 111, i.e., cause rotation of the blade 115. In this respect, the power transfer arrangement 300 may be provided to power the choppers 111 of the header 200. However, it should be appreciated that the power transfer arrangement 300 can alternatively be used to power the row units 210, e.g., to pull corn ears towards the deck plates 211A, 211B, by coupling the first clutch assembly 320 to the gearbox 130 rather than the gearbox 340, as will be described further herein. The first slip clutch assembly 320 is also coupled to the second drive shaft 330, which is also coupled to the second slip clutch assembly 350, in a straight-through solid way so the first slip clutch assembly 320 is coupled to the second slip clutch assembly 350 by the second drive shaft 330. The second slip clutch assembly 350 may in turn be coupled to a second gearbox 360 with overload torque protection, which is coupled to another one of the choppers 111 to drive the chopper 111. The second slip clutch assembly 350 may also be coupled to a third drive shaft 370 that is coupled to a third slip clutch assembly 380 coupled to another gearbox 390 with overload torque protection that drives another one of the choppers 111. In this respect, the power transfer arrangement 300 can include a plurality of slip clutch assemblies 320, 350, 380 that each couple to a pair of respective drive shafts 310, 330, 370 as well as a respective gearbox 340, 360, 390 to drive a respective one of the choppers 111. Alternatively, the power transfer arrangement 300 can be provided so that each of the slip clutch assemblies 320, 350, 390 is coupled to a respective gearbox, e.g., gearbox 130, that drives one of the row units. In some embodiments, a pair of power transfer arrangements 300 may be provided, with one of the power transfer arrangements including gearboxes that each couple to and drive a respective one of the row units 210 while the other power transfer arrangement includes gearboxes that each couple to and drive a respective one of the choppers 111. It should thus be appreciated that one or more power transfer arrangements 300 provided according to the present disclosure may be used to transfer power from a power source 260 to various driven components of the header 100.

Referring specifically now to FIGS. 4-5, an exemplary embodiment of a slip clutch assembly is illustrated. The slip clutch assembly illustrated in FIGS. 4-5 may be used as the first slip clutch assembly 320 and/or the second slip clutch assembly 350. In some embodiments, the first slip clutch assembly 320 and the second slip clutch assembly 350 are identical, i.e., the clutch assemblies 320, 350 both have the same constituent components with very little deviation in shape and geometry between the components. The use of the term "identical" herein thus refers to clutch assemblies 320, 350 being nearly identical, taking into account the normal deviations between parts that can occur due to manufacturing tolerances and tolerance stack-up. For ease of description, the slip clutch assembly illustrated in FIGS. 4-5 is described further herein as the first slip clutch assembly 320 but, as just described, the slip clutch assembly in FIGS. 4-5 may also be the second slip clutch assembly 350.

The first slip clutch assembly 320 includes a drive hub 410, a clutch housing 420 coupled to the drive hub 410, and a clutch hub 430 partially disposed within the clutch housing 420. When the slip clutch assembly illustrated in FIGS. 4-5 is also or alternatively the second slip clutch assembly 350, the drive hub 410, the clutch housing 420, and the clutch hub 430 may be referred to as a second drive hub 410, a second clutch housing 420, and a second clutch hub respectively. The drive hub 410 includes a spline 411 that may be coupled to the gearbox 340 (or the gearbox 130) or is configured to couple to the gearbox 340 (or the gearbox 130) if the first slip clutch assembly 320 is disconnected from the gearbox. The drive hub 410 and the spline 411 may have any shapes and configurations that are suitable for coupling to the gearbox 340 (or the gear box 130), with many such shapes and configurations being known. The drive hub 410 may also include a compound port 412 for introducing lubricant, such as grease, into the clutch housing 420 and the clutch hub 430.

The clutch housing 420 is coupled to the drive hub 410. As illustrated, the clutch housing 420 may have a cylindrical shape with one or more lobes 421 extending from a circumferential surface of the housing 420; alternatively, the clutch housing 420 may be a smooth cylinder without lobes. The clutch housing 420 has an end face 422 that defines an opening 423 therein. The opening 423 may extend from the end face 422 to an opposite end 424, which may be welded or otherwise coupled with the drive hub 410 so the clutch housing 420 is coupled to the drive hub 410. Referring specifically to FIG. 5, it is illustrated that the clutch housing 420 may have one or more grooves 425, 426 formed in an interior surface 427 of the clutch housing 420. One of the grooves 425 may house a snap ring 401 that is pressed against a thrust washer 402 that bears against the clutch hub 430. The other groove 426 may hold a portion of a primary seal 440 to hold the primary seal 440 in place.

The clutch hub 430 is partially disposed within the clutch housing 420. The clutch hub 430 is configured to rotate the clutch housing 420 and the coupled drive hub 410 during rotation of the clutch hub 430. During normal rotation of the clutch hub 430, the clutch housing 420 and the drive hub 410 are rotatably coupled with the clutch housing 420, e.g., using springs or other types of couplers. The clutch hub 430 is rotatable with respect to the clutch housing 420 during a slip condition, so the clutch hub 430 rotates independently, i.e., the clutch hub 430 and the clutch housing 420 do not rotate at the same rotational velocity during a slip condition. The slip condition that causes relative rotation between the clutch housing 420 and the clutch hub 430 may be an overload condition at the row unit 210 coupled to the gearbox 340 (or one of the choppers 111 coupled to the gearbox 130). It should be appreciated that the clutch hub 430 can be configured in a variety of ways to rotate with respect to the clutch housing 420, i.e, slip, in response to different conditions where slip is desired, as is known.

The clutch hub 430 includes a coupling 431 that extends out of the opening 423 formed in the clutch housing 420 so the coupling 431 extends outside of the clutch housing 420. The coupling 431 is coupled to the first drive shaft 310 outside of the clutch housing 420. The coupling 431 may be, for example, a flange or similar structure that mates with a corresponding flange 311 of the first drive shaft 310 so rotation of the first drive shaft 310 causes a corresponding rotation of the clutch hub 430. The rotating clutch hub 430 acts as a coupling between the first drive shaft 310 and the gear box 340 by virtue of being coupled to the drive hub 410 that is rotatably coupled to the gear box 340. In this respect, the first slip clutch assembly 320 acts as a coupling between the first drive shaft 310 and the gear box 340 to transfer power from the first drive shaft 310 to the gear box 340 and drive the respectively coupled row unit 210. Further, the clutch hub 430 including the coupling 431 that extends outside of the clutch housing 420 makes it relatively easy and quick to uncouple the coupling 431 from the first drive shaft 310, which can reduce the burden associated with servicing the first slip clutch assembly 320 and/or the coupled gear box 340.

Unlike known power transfer arrangements, which generally include a single drive shaft that power a plurality of row units (or choppers), the power transfer arrangement 300 provided according to the present disclosure includes multiple drive shafts that power the row units 210 (and/or choppers 111). As previously described, the second drive shaft 330 is coupled to the first slip clutch assembly 320. In particular, the second drive shaft 330 may be coupled to the clutch hub 430. For example, the clutch hub 430 may have a hub opening 432 formed therein that is engaged with the second drive shaft 330. The second drive shaft 330 may, for example, be a hexagonal drive shaft having a hexagonal cross-section and the hub opening 432 may have a corresponding hexagonal shape that accepts and engages the second drive shaft 330 so rotation of the clutch hub 430 also rotates the second drive shaft 330. The first drive shaft 310 may also be a hexagonal drive shaft having a hexagonal cross-section, and in some embodiments may have similar dimensions to the second drive shaft 330 so the drive shafts 310, 330 are interchangeable. Coupling the second drive shaft 330 to the clutch hub 430, rather than the drive hub 410, allows the clutch hub 430 to continue rotating the second drive shaft 330 during a slip condition so power transfer to the second drive shaft 330 is not interrupted during a slip condition of the first slip clutch assembly 320.

The second slip clutch assembly 350 is coupled to the second drive shaft 330. As previously described, the second slip clutch assembly 350 may be identical to the first slip clutch assembly 320 and include a second drive hub 410, a second clutch housing 420 coupled to the second drive hub 410, and a second clutch hub 430 disposed partially within the second clutch housing 410, with the second clutch hub 430 being configured to rotate the second clutch housing 410 and also slip during a slip condition. Also similarly to the first slip clutch assembly 320, the second clutch hub 430 includes a second coupling 431 that extends outside of the second clutch housing and is coupled to the second drive shaft 330. The second drive hub 410 is coupled to the second gear box 360, which may be coupled to another one of the row units 210 in order to drive the coupled row unit 210. The second slip clutch assembly 350 thus acts as a coupling between the second drive shaft 330 and the second gear box 360 in order to drive another one of the row units 210. In this respect, each of the slip clutch assemblies 310, 350 couples their respectively coupled gear box 340, 360 to the power source 260 via the drive shafts 310, 330 in order to power the row unit 210 coupled to each of the gear boxes 340, 360.

The third drive shaft 370 may be coupled to the second slip clutch assembly 350 in a similar manner by coupling to the second clutch hub 430. The third drive shaft 370 may be coupled to the third slip clutch assembly 380, which may also be identical to the first slip clutch assembly 320 and the second slip clutch assembly 350 and is coupled to the third gear box 390. The third drive shaft 370 may couple to a third clutch hub 430 of the third slip clutch assembly 380, similarly to how the previously described drive shafts 310, 330 couple to a respective clutch hub 430 of the first slip clutch assembly 320 and the second slip clutch assembly 350. It should thus be appreciated that the power transfer arrangement 300 provided according to the present disclosure may include multiple slip clutch assemblies 320, 350, 380 that are coupled to one another by drive shafts 310, 330, 370 and couple to a respective gear box 340, 360, 390 to drive a respective row unit 210 (or alternatively to drive a respective chopper 111). While three slip clutch assemblies 320, 350, 380 are illustrated and described, it should be further appreciated that more than three slip clutch assemblies, e.g., 4, 5, 6, 7, 8, 9, 10, or more, slip clutch assemblies may be provided according to the present disclosure in order to couple a respective gear box and row unit (or chopper) to the power source 260 and drive the row unit (or chopper). In some embodiments, a single coupling may be coupled to one or more gearboxes powering multiple row units or choppers.

In some embodiments, there is a gap G formed between a drive shaft and its adjacent coupling, such as the drive shaft 310 and the coupling 431, when the drive shaft 310 and coupling 431 are uncoupled to simplify installation and maintenance. In some embodiments, the gap G is present between the coupled drive shaft and coupling when coupled together as well. For example, the coupling 431 may be spaced from the drive shaft 310 and coupled to the drive shaft 310 with one or more elongated fasteners, such as one or more bolts. When the fastener(s) is uncoupled so the coupling 431 is uncoupled from the drive shaft 310, the gap G between the coupling 431 and the drive shaft 310 allows the drive shaft 310 to slide. A similar gap can also be provided between the drive shaft 330 and the coupling 431 of the slip clutch assembly 350, providing a gap for sliding the drive shaft 330. Sliding the drive shaft 310 in the gap(s) G allows the drive shaft 310 to be disconnected individually from the power transfer arrangement 200 without having to remove any of the other drive shafts 330, 370. This is in contrast to many known arrangements where the drive shaft(s) powering the choppers and/or row units must all be removed for maintenance even if only one of the drive shafts requires maintenance. In this respect, the size of the gap G can be adjusted so that the drive shaft can be removed when uncoupled from the corresponding coupling (and adjacent drive shaft if applicable) without having to also remove one or more other drive shafts. Thus, the power transfer arrangement 200 provided according to the present disclosure can reduce downtime of the vehicle 100 by simplifying maintenance of the drive shafts 310, 330, 370.

In some embodiments, the power transfer arrangement 200 includes a seal 301 that disposed between the coupling 431 of the clutch hub 430 and an exterior of the clutch housing 420, e.g., between the coupling 431 and the end face 422. The seal 301 may comprise, for example, a polymeric material and be provided in the shape of what is commonly known as a V-ring seal. A similar (or identical) seal 302 may also be disposed between the second coupling 431 and an exterior, e.g., the end face 422, of the second clutch housing 420. The seal 301 can reduce the amount of contaminants, such as dust and dirt, from entering the slip clutch assemblies 320, 350, 380 to improve the longevity of the slip clutch assemblies 320, 350, 380.

From the foregoing, it should be appreciated that the power transfer arrangement 200 provided according to the present disclosure has a plurality of slip clutch assemblies 320, 350, 380 that each couple to a pair of drive shafts 310, 330, 370 in order to transfer power to a respective gear box 130, 340, 360, 390 and drive a respective row unit 210 (or chopper 111). Since the slip clutch assemblies 320, 350, 380 each couple to a pair of drive shafts 310, 330, 370, rather than all of the slip clutch assemblies 320, 350, 380 and the gear boxes 130, 340, 360, 390 being coupled to a common drive shaft, the components of the power transfer arrangement 200 can be more easily disconnected and removed for service. Further, each of the drive shafts 310, 330, 370 is individually smaller than a single drive shaft that would be needed to commonly drive all of the slip clutch assemblies 320, 350, 380 and the gear boxes 130, 340, 360, 390. The drive shafts 310, 330, 370 being individually smaller makes each individual drive shaft 310, 330, 370 both easier and less expensive to replace, which further reduces maintenance burden. The power transfer arrangement 200 can also be scaled up to transfer power in increasingly wider headers without having to provide a very long single drive shaft. Therefore, the power transfer arrangement 200 provided according to the present disclosure is effective to transfer power to row units 210 and/or choppers 111 of the header 100 in a manner that both reduces maintenance burden and can be configured for use in a header of any width.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A power transfer arrangement for a header of an agricultural vehicle, the power transfer arrangement comprising:
   a first drive shaft coupled to a power source;
   a first slip clutch assembly comprising:
      a drive hub;
      a clutch housing coupled to the drive hub; and
      a clutch hub disposed partially within the clutch housing and comprising a coupling that extends outside of the clutch housing and is coupled to the first drive shaft, the clutch hub enabling rotation of the clutch housing and the coupled drive hub;
   a second drive shaft coupled to the clutch hub; a gearbox coupled to the drive hub; and
   a second slip clutch assembly comprising:
      a second drive hub;
      a second clutch housing coupled to the second drive hub; and
      a second clutch hub disposed partially within the second clutch housing and comprising a second coupling that extends outside of the second clutch housing and is coupled to the second drive shaft.

2. The power transfer arrangement of claim 1, wherein the first slip clutch assembly and the second slip clutch assembly are identical.

3. The power transfer arrangement of claim 1, wherein the first drive shaft and/or the second drive shaft is a hexagonal drive shaft.

4. The power transfer arrangement of claim 1, further comprising a seal disposed between the coupling and an exterior of the clutch housing and/or between the second coupling and an exterior of the second clutch housing.

5. The power transfer arrangement of claim 1, wherein the coupling comprises a flange and the first drive shaft couples to the flange and/or the second coupling comprises a second flange and the second drive shaft couples to the second flange.

6. The power transfer arrangement of claim 1, further comprising a primary gearbox coupled to the first drive shaft, wherein the primary gearbox is the power source.

7. A header for an agricultural vehicle, the header comprising:
   a header frame;
   a plurality of row units carried by the header frame, each of the row units comprising a pair of deck plates, at least one of the deck plates being movable to adjust a size of a gap therebetween;
   a plurality of choppers, each of the choppers being associated with at least one respective row unit and comprising a blade;
   a power source; and
   a power transfer arrangement comprising:
      a first drive shaft coupled to the power source; a first slip clutch assembly comprising:
         a drive hub;
         a clutch housing coupled to the drive hub; and
         a clutch hub disposed partially within the clutch housing and comprising a coupling that extends outside of the clutch housing and is coupled to the first drive shaft, the clutch hub enabling rotation of the clutch housing and the coupled drive hub;
      a second drive shaft coupled to the clutch hub;
      a gearbox coupled to the drive hub and one of the row units or one of the choppers; and
      a second slip clutch assembly comprising:
         a second drive hub;
         a second clutch housing coupled to the second drive hub; and
         a second clutch hub disposed partially within the second clutch housing and comprising a second coupling that extends outside of the second clutch housing and is coupled to the second drive shaft.

8. The header of claim 7, wherein the first slip clutch assembly and the second slip clutch assembly are identical.

9. The header of claim 7, wherein the first drive shaft and/or the second drive shaft is a hexagonal drive shaft.

10. The header of claim 7, further comprising a seal disposed between the coupling and an exterior of the clutch housing and/or between the second coupling and an exterior of the second clutch housing.

11. The header of claim 7, wherein the coupling comprises a flange and the first drive shaft couples to the flange and/or the second coupling comprises a second flange and the second drive shaft couples to the second flange.

12. The header of claim 7, wherein the power source comprises a primary gearbox coupled to a power take-off.

13. An agricultural vehicle, comprising:
   a chassis;
   a feeder housing carried by the chassis; and
   a header coupled to the feeder housing, the header comprising:
      a header frame;
      a plurality of row units carried by the header frame, each of the row units comprising a pair of deck plates, at least one of the deck plates being movable to adjust a size of a gap therebetween;
      a plurality of choppers, each of the choppers being associated with at least one respective row unit and comprising a blade;
      a power source; and
      a power transfer arrangement comprising:
         a first drive shaft coupled to the power source;
         a first slip clutch assembly comprising:
            a drive hub;
            a clutch housing coupled to the drive hub; and
            a clutch hub disposed partially within the clutch housing and comprising a coupling that extends outside of the clutch housing and is coupled to the first drive shaft, the clutch hub enabling rotation of the clutch housing and the coupled drive hub;
         a second drive shaft coupled to the clutch hub;
         a gearbox coupled to the drive hub and one of the row units or one of the choppers; and
         a second slip clutch assembly comprising:
            a second drive hub;
            a second clutch housing coupled to the second drive hub; and
            a second clutch hub disposed partially within the second clutch housing and comprising a second coupling that extends outside of the second clutch housing and is coupled to the second drive shaft.

14. The agricultural vehicle of claim 13, wherein the first slip clutch assembly and the second slip clutch assembly are identical.

15. The agricultural vehicle of claim 13, wherein the first drive shaft and/or the second drive shaft is a hexagonal drive shaft.

16. The agricultural vehicle of claim 13, further comprising a seal disposed between the coupling and an exterior of the clutch housing and/or between the second coupling and an exterior of the second clutch housing.

17. The agricultural vehicle of claim 13, wherein the coupling comprises a flange and the first drive shaft couples to the flange and/or the second coupling comprises a second flange and the second drive shaft couples to the second flange.

18. The agricultural vehicle of claim 13, further comprising a power take-off, wherein the power source comprises a primary gearbox coupled to the power take-off.

* * * * *